US008533243B2

(12) United States Patent
Yonemura et al.

(10) Patent No.: US 8,533,243 B2
(45) Date of Patent: Sep. 10, 2013

(54) REPRESENTATION CONVERTING APPARATUS, ARITHMETIC APPARATUS, REPRESENTATION CONVERTING METHOD, AND COMPUTER PROGRAM PRODUCT

(75) Inventors: Tomoko Yonemura, Kanagawa (JP); Hirofumi Muratani, Kanagawa (JP); Kenji Ohkuma, Kanagawa (JP); Hanae Ikeda, Tokyo (JP); Taichi Isogai, Tokyo (JP); Kenichiro Furuta, Tokyo (JP); Yoshikazu Hanatani, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1123 days.

(21) Appl. No.: 12/397,648

(22) Filed: Mar. 4, 2009

(65) Prior Publication Data

US 2010/0049777 A1    Feb. 25, 2010

(30) Foreign Application Priority Data

Aug. 25, 2008   (JP) ................. 2008-216019

(51) Int. Cl.
*G06F 7/00* (2006.01)
*G06F 15/00* (2006.01)

(52) U.S. Cl.
USPC ........................................... 708/204

(58) Field of Classification Search
None
See application file for complete search history.

(56) References Cited

U.S. PATENT DOCUMENTS

2004/0158597 A1* 8/2004 Ye et al. .............. 708/492
2006/0274894 A1* 12/2006 Vasyltsov et al. ........... 380/28
2006/0280296 A1* 12/2006 Vasyltsov et al. ........... 380/28
2007/0183505 A1* 8/2007 Shimizu et al. .......... 375/240.16
2009/0180611 A1* 7/2009 Douguet et al. ............ 380/30

FOREIGN PATENT DOCUMENTS

JP       2009-169171 A     7/2009

OTHER PUBLICATIONS

U.S. Appl. No. 13/225,964, filed Sep. 6, 2011, Hanatani, et al.
U.S. Appl. No. 12/407,475, filed Mar. 19, 2009, Yonemura, et al.
Karl Rubin et al., "Torus-Based Cryptography", CRYPTO 2003, LNCS 2729, 16 pages, 2003.
Steven Galbraith, "Disguising tori and elliptic curves" IACR e-print Archive 2006/248, pp. 1-12, http://eprint.iacr.org/2006/248.
Ronald Cramer et al., "A Practical Public Key Cryptosystem Provably Secure Against Adaptive Chosen Ciphertext Attack", CRYPTO '98, LNCS 1462, 13 pages, Feb. 16, 1998.

(Continued)

*Primary Examiner* — Henry Tsai
*Assistant Examiner* — Aurangzeb Hassan
(74) *Attorney, Agent, or Firm* — Oblon, Spivak, McClelland, Maier & Neustadt, L.L.P.

(57) ABSTRACT

When converting an affine representation representing a 2r-th degree algebraic torus $T_{2r}(F_q)$ (r is a prime number, and q is an integer) to a projective representation representing a quadratic algebraic torus $T_2(F_{q^r})$, a representation converting apparatus acquires member $(c_0, c_1, \ldots, c_{r-2})$, ($c_i$ is a member of a finite field $F_q$, where $0 \leq i \leq r-2$) of a 2r-th degree algebraic torus $T_{2r}(F_q)$ represented by the affine representation. The apparatus performs a multiplication operation on the acquired member. The multiplication operation is determined by a condition under which a member of a quadratic algebraic torus $T_2(F_{q^r})$ is included in the 2r-th degree algebraic torus $T_{2r}(F_q)$, a modulus and a base of a quadratic extension, and a modulus and a base of an r-th degree extension. The representation converting apparatus then performs an addition and subtraction operation determined by the condition, the moduli, and the bases.

25 Claims, 4 Drawing Sheets

(56) References Cited

OTHER PUBLICATIONS

R. Granger et al., "On Small Characteristic Algebraic Tori in Pairing-Based Cryptography", LMS Journal of Computation and Mathematics, 9, pp. 64-85, Mar. 9, 2006.

Rudolf Lidi et al., "Finite Fields", vol. 20 of Encyclopedia of Mathematics and its Applications, Cambridge University Press, 3 pages, 1983.

Daniel V. Bailey et al., "Optimal Extension Fields for Fast Arithmetic in Public-Key Algorithms", CRYPTO 1998, LNCS 1462, pp. 472-485, 1998.

Ronald Cramer et al., "Design and Analysis of Practical Public-Key Encryption Schemes Secure against Adaptive Chosen Ciphertext Attack", SIAM Journal on Computing, 33(1):, 69 pages, Aug. 14, 2003.

Japanese Office Action issued Mar. 12, 2013 in Patent Application No. 2008-216019 with English Translation.

Tomoko Yonemura et al., "Cryptosystems on Algebraic Tori: Parameter Generation with Security and Efficiency", The Technical Report of the Proceeding of the Institute of Electronics, vol. 108, No. 207, Sep. 5, 2008, pp. 25-32 (with English Abstract).

* cited by examiner

REPRESENTATION CONVERTING APPARATUS, ARITHMETIC APPARATUS, REPRESENTATION CONVERTING METHOD, AND COMPUTER PROGRAM PRODUCT

CROSS-REFERENCE TO RELATED APPLICATIONS

This application is based upon and claims the benefit of priority from the prior Japanese Patent Application No. 2008-216019, filed on Aug. 25, 2008; the entire contents of which are incorporated herein by reference.

BACKGROUND OF THE INVENTION

1. Field of the Invention

The present invention relates to a representation converting apparatus, an arithmetic apparatus, a representation converting method, and a computer program product for converting an affine representation representing a 2r-th degree algebraic torus $T_{2r}(F_q)$ to a projective representation representing a quadratic algebraic torus $T_2(F_{q^r})$.

2. Description of the Related Art

Public key cryptography actualizing secure communication without requiring a key to be shared in advance is widely used as a basic technology behind network security. Information terminals are becoming more diverse. Various schemes and protocols using a public key are being used in small devices through innovations in methods and packaging. In public key cryptography, a typical cryptographic system size is currently 1024 bits. However, a cryptographic system size considered difficult to decrypt is increasing every year, because attackers are becoming increasingly skilled with the advancement in computing devices. In public key cryptography, public key size and encrypted data size differ depending on a method being used. However, the public key size and the encrypted data size may be several times the cryptographic system size. Therefore, an increase in cryptographic system size becomes a problem for devices having insufficient memory capacity and communication bandwidth. As a result, a method has been proposed for compressing the public key size and the encrypted data size in public key cryptography (refer to, for example, K. Rubin and A Silverberg, "Torus-Based Cryptography", CRYPTO 2003, LNCS 2729, 349-365, 2003). A basis of the method is that, when a subset, referred to as an algebraic torus, in a set of numbers used in public key cryptography is used, a member of the set can be represented by a small number of bits. A mapping for performing conversion to the representation by a small number of bits is written as $\rho$ and will be referred to as Rubin-Silverberg (RS) compression map. A specific example of when a encrypted data is compressed will be described. In RS compression map, computation is performed with a encrypted data c as an input. A compressed encrypted data $\gamma$ is obtained by a following Expression 1.

$$\rho(c)=\gamma \quad (1)$$

To convert back to a representation by an original number of bits, a reverse map of $\rho$ is calculated. The reverse map of $\rho$ is written as $\rho^{-1}$ and will be referred to as RS decompression map. In RS decompression map, computation is performed when $\gamma$ is obtained as a compressed encrypted data. c is obtained by a following Expression 2.

$$\rho^{-1}(\gamma)=c \quad (2)$$

As methods for representing the algebraic torus, an affine representation, a projective representation, and an extension field representation are known (refer to, for example, Steven Galbraith, "Disguising tori and elliptic curves", IACR e-print Archive 2006/248, http://eprint.iacr.org/2006/248). In an algebraic torus such as this, decompression map refers to conversions of a member of the algebraic torus from the affine representation to the projective representation, from the projective representation to the extension field representation, and the affine representation to the extension field representation. On the other hand, conversions of a member of the algebraic torus from the extension field representation to the projective representation, from the projective representation to the affine representation, and the extension field representation to the affine representation are equivalent to compression map. Compression map and decompression map using the algebraic torus such as those described above can also be applied to signatures in digital signatures and exchange messages in key exchange schemes, in addition to public keys and encrypted datas in public key cryptography. For example, in R. Cramer and V. Shoup, "A practical public key cryptosystem provably secure against adaptive chosen encrypted data attack", CRYPTO'98, LNCS 1462, pp. 13-25, 1998, El Gamal encryption and Diffie-Hellman (DH) key exchange using an algebraic torus over a prime field are proposed. In R. Cramer and V. Shoup, "A practical public key cryptosystem provably secure against adaptive chosen encrypted data attack", CRYPTO'98, LNCS 1462, pp. 13-25, 1998, Cramer-Shoup cryptosystem is proposed. In the Cramer-Shoup cryptosystem, security in a standard model is proven. For example, plain data and encrypted data are members of a prime order subgroup G of a multiplicative group G~ of a prime field of which an order is a prime number. At this time, the plain data and the encrypted data are represented by the multiplicative group G~ of the prime field. A member of a small group G is needlessly represented by a large group G~. Therefore, when G~ in the Cramer-Shoup cryptosystem serves as a multiplicative group of an extension field, and G serves as an algebraic torus, the plain data and the encrypted data are members of G and can be represented by G. Needless representation can be eliminated. When G~ in the Cramer-Shoup cryptosystem serves as the multiplicative group of an extension field, and G is a secure subgroup of an algebraic torus, needless representation can be reduced. Encryption that can eliminate or reduce needless representation through application of an algebraic torus is not limited to the El Gamal encryption, the DH key exchange, and the Cramer-Shoup cryptosystem.

The RS compression map and the RS decompression map compress and decompress an algebraic torus $T_6(F_q)$ defined over the prime field. Here, the cryptographic system size is 2048 bits. A size of p regarding a p-order (prime order) prime field is at least "ceil(2048/6)=342" bits. Ceil(x) is referred to as a ceiling function and returns a least integer that is equal to or greater than x. The size of p exceeds a word length, such as 32 bits and 64 bits of a computing device. Calculation on the algebraic torus is actualized by calculation on a finite field on which the algebraic torus is defined or a basic field thereof. Therefore, regarding an algebraic torus $T_n(F_q)$ defined over a prime field $F_q$, calculation on the algebraic torus $T_n(F_q)$ is actualized using calculation on the prime field $F_q$. When a size of the prime field exceeds the word length, calculation becomes difficult to perform using the computing device.

Therefore, to reduce the size of the prime field, use of an algebraic torus $T_6(F_{q^r})$ defined over an extension field $F_{q^r}$ is considered. The size of p of an extension field of a p^r-th order is at least "ceil(2048/(6*r))". The size of p can be reduced through adjustment of an extension degree r. For example, when "r=24", p is 15 bits. When "r=27", p is 13 bits. At this time, the RS compression map and the RS decompression map cannot be used with an extension degree such as this. In the RS method, a sixth degree extension field is configured using a cyclotomic field or a subfield of a cyclotomic field as a quadratic extension of a cubic extension. Conditions are strict for a cyclotomic polynomial that is a modulus of the cyclotomic field to become irreducible over an extension field. The conditions may contradict conditions imposed on the extension degree r to configure an algebraic torus of a prime order.

On the other hand, regarding compression map and decompression map of an algebraic torus defined over an extension field, for example, a mapping method proposed in R. Granger, D. Page, and M. Stam, "On Small Characteristic Algebraic Tori in Pairing Based Cryptography", LMS Journal of Computation and Mathematics, 9, pp. 64-85, 2006 is known. Compression map and decompression map based on the proposed mapping method are respectively referred to as Granger-Page-Stam (GPS) compression map and GPS decompression map. In the GPS method, a sixth degree extension field is configured as a quadratic extension of a cubic extension, in a manner similar to that of a Duursma-Lee method (a Tate pairing computation method). In the Duursma-Lee method, "p=3".

In this case, when r is retrieved under the conditions imposed on the extension degree r to configure an algebraic torus of a prime order, a suitable parameter cannot be found. In other words, when the torus defined over the extension field is used and the order thereof is a prime number, the compression map and the decompression map described in K. Rubin and A Silverberg, "Torus-Based Cryptography", CRYPTO 2003, LNCS 2729, 349-365, 2003, and R. Granger, D. Page, and M. Stam, "On Small Characteristic Algebraic Tori in Pairing Based Cryptography", LMS Journal of Computation and Mathematics, 9, pp. 64-85, 2006 may not be usable. Moreover, when a common decompression map method is used, processing load of calculation processes, such as an encryption process and a decryption process, after conversion from the affine representation to the projective representation may increase.

SUMMARY OF THE INVENTION

According to one aspect of the present invention, a representation converting apparatus that converts an affine representation representing a 2r-th degree algebraic torus $T_{2r}(F_q)$ (r is a prime number, and q is an integer) to a projective representation representing a quadratic algebraic torus $T_2(F_{q^r})$, the apparatus comprising: an acquiring unit that acquires a set of member of the 2r-th degree algebraic torus $T_{2r}(F_q)$ represented by the affine representation, the acquired set being ($c_0, c_1, \ldots, c_{r-2}$) ($c_i$ is a member of a finite field $F_q$, where $0 \leq i \leq r-2$); a multiplying unit that performs a multiplication operation on the acquired set, the multiplication operation being determined by a condition under which the set of the quadratic algebraic torus $T_2(F_{q^r})$ is included in the 2r-th degree algebraic torus $T_{2r}(F_q)$, a modulus and a base of a quadratic extension, and a modulus and a base of an r-th degree extension; an adding/subtracting unit that performs an addition and subtraction operation determined by the condition, the moduli, and the bases, and obtains a set of member of the quadratic algebraic torus $T_2(F_{q^r})$ represented by the projective representation, the obtained set being ($a_0, a_1, \ldots, a_{r-1}, b_0, b_1, \ldots, b_{r-1}$) ($a_j$ is a member of $F_q$ and $b_j$ is a member of $F_q$, where $0 \leq j \leq r-1$); and an output unit that outputs the obtained set, wherein x is a member added during a quadratic extension from an extension field $F_{q^r}$ to an extension field $F_{q^{2r}}$, and the modulus of the quadratic extension is "$f_2(x)=x^2-\delta$" and the base of the quadratic extension is $\{1,x\}$.

According to another aspect of the present invention, an arithmetic apparatus that performs calculation after conversion from an affine representation representing a 2r-th degree algebraic torus $T_{2r}(F_q)$ (r is a prime number, and q is an integer) to a projective representation representing a quadratic algebraic torus $T_2(F_{q^r})$, the apparatus comprising: an acquiring unit that acquires a set of member of the 2r-th degree algebraic torus $T_{2r}(F_q)$ represented by the affine representation, the acquired set being ($c_0, c_1, \ldots, c_{r-2}$) ($c_i$ is a member of a finite field $F_q$, where $0 \leq i \leq r-2$); a multiplying unit that performs a multiplication operation on the acquired set, the multiplication operation being determined by a condition under which the set of the quadratic algebraic torus $T_2(F_{q^r})$ is included in the 2r-th degree algebraic torus $T_{2r}(F_q)$, a modulus ($f_2(x)=x^2-\delta$) and a base $\{1,x\}$ of a quadratic extension, and a modulus and a base of an r-th degree extension; an adding/subtracting unit that performs an addition and subtraction operation determined by the condition, the moduli, and the bases, and obtains a set of member of the quadratic algebraic torus $T_2(F_{q^r})$ represented by the projective representation, the obtained set being ($a_0, a_1, \ldots, a_{r-1}, b_0, b_1, \ldots, b_{r-1}$) ($a_j$ is a member of $F_q$ and $b_j$ is a member of $F_q$, where $0 \leq j \leq r-1$); and a calculating unit that performs calculation based on the obtained set, the calculation being determined by the modulus and the base of the quadratic extension and the modulus and the base of the r-th degree extension.

According to still another aspect of the present invention, a representation converting method executed in a representation converting apparatus that includes an acquiring unit, a multiplying unit, an adding/subtracting unit, and an output unit, and converts an affine representation representing a 2r-th degree algebraic torus $T_{2r}(F_q)$ (r is a prime number, and q is an integer) to a projective representation representing a quadratic algebraic torus $T_2(F_{q^r})$, the method comprising: acquiring a set of member of the 2r-th degree algebraic torus $T_{2r}(F_q)$ represented by the affine representation, the acquired set being ($c_0, c_1, \ldots, c_{r-2}$) ($c_i$ is a member of a finite field $F_q$, where $0 \leq i \leq r-2$), by the acquiring unit; performing a multiplication operation on the acquired set, by the multiplying unit, the multiplication operation being determined by a condition under which the set of the quadratic algebraic torus $T_2(F_{q^r})$ is included in the 2r-th degree algebraic torus $T_{2r}(F_q)$, a modulus and a base of a quadratic extension, and a modulus and a base of an r-th degree extension; performing an addition and subtraction operation determined by the condition, the moduli, and the bases, and obtaining a set of member of the quadratic algebraic torus $T_2(F_{q^r})$ represented by the projective representation, the obtained set being ($a_0, a_1, \ldots, a_{r-1}, b_0, b_1, \ldots, b_{r-1}$) ($a_j$ is a member of $F_q$ and $b_j$ is a member of $F_q$, where $0 \leq j \leq r-1$), by the adding/subtracting unit; and outputting the obtained set, by the output unit, wherein x is a member added during a quadratic extension from an extension field $F_{q^r}$ to an extension field $F_{q^{2r}}$, and the modulus of the quadratic extension is "$f_2(x)=x^2-\delta$" and the base of the quadratic extension is $\{1,x\}$.

A computer program product according to still another aspect of the present invention causes a computer to perform the method according to the present invention.

DETAILED DESCRIPTION OF THE INVENTION

First, a computation principle on which decompression map according to an embodiment of the present invention is based will be described. Decompression map is performed for a conversion from an affine representation to a projective representation. The affine representation represents a 2r-th degree algebraic torus $T_{2r}(F_{q^m})$ in which q is represented by p^m (p is a prime number, and m is an integer). The projective representation represents a quadratic algebraic torus $T_2(F_{q^{rm}})$. For example, when "r=3", a sixth degree extension field can be considered to be configured using a common extension as a quadratic extension of a cubic extension. It cannot be said that calculation on a common extension field is efficient. Therefore, according to an embodiment of the present invention, the sixth degree extension field is configured as a quadratic extension of a cubic extension. In this case, in the GPS method, the cubic extension is configured by a trinomial and the quadratic extension is configured by a binomial. However, according to the embodiment, the cubic extension and the quadratic extension are each configured by a binomial, a reason being that calculation on the extension field becomes easier when extension is performed using a binomial. Therefore, according to the embodiment, decompression map allowing calculation such as that above is configured.

First, a computational expression for converting the projective representation to the affine representation will be disclosed. A computational expression for reverse map which converts the affine representation to the projective representation from the obtained computational expression will also be disclosed. The algebraic torus $T_6(F_{q^m})$ is a subgroup of a multiplicative group of an extension field $F_{q^6m}$. Therefore, the algebraic torus $T_6(F_{q^m})$ can be expressed in the extension field $F_{q^6m}$. This is extension field representation. In extension field representation, a single member of $T_6(F_{q^m})$ is expressed by six members of an extension field $F_{q^m}$. In a similar manner, the algebraic torus $T_6(F_{q^m})$ is a subgroup of an algebraic torus $T_2(F_{q^3m})$. Therefore, the algebraic torus $T_6(F_{q^m})$ can be expressed by the algebraic torus $T_2(F_{q^3m})$. This is projective representation. An order of the algebraic torus $T_2(F_{q^3m})$ is (p^3m+1). "^" indicates exponentiation. When a member of an order (p^6m−1) that is a member of the multiplicative group of the extension field $F_{q^6m}$ is raised to the power of (p^3m+1)/(p^6m−1), a member of the order (p^3m+1) is obtained. In other words, a member of $T_2(F_{q^3m})$ is obtained. Because "(p^3m+1)/(p^6m−1)=p^3m−1", when a member of the extension field $F_{q^6m}$ is "α+βx", that expressed by a following Expression 3 is the member of the algebraic torus $T_2(F_{q^3m})$.

$$(\alpha + \beta x)^{p^{3m}-1} = \frac{\alpha - \beta x}{\alpha + \beta x} \tag{3}$$

Here, α and β are members of an extension field $F_{q^3m}$. x is a member added during quadratic extension from the extension field $F_{q^3m}$ to the extension field $F_{q^6m}$.

A modulus of the quadratic extension is "$f_2(x)=x^2-\delta$". A base of the quadratic extension is {1,x}. δ is a member of $F_{q^m}$. A modulus of the cubic extension is "$f_3(y)=y^3-w$". A base of the cubic extension is {1, y, y^2}. y is a member added during a cubic extension from the extension field $F_{q^m}$ to the extension field $F_{q^3m}$. w is a member of the extension field $F_{q^m}$.

The projective representation represents a member of the algebraic torus $T_2(F_{q^3m})$. An member in the projective representation that becomes "1" by being raised to the power of an order of the algebraic torus $T_6(F_{q^m})$ is a member of the algebraic torus $T_6(F_{q^m})$. In other words, a condition imposed for α and β is that a following conditional Expression 4 is met.

$$\left(\frac{\alpha - \beta x}{\alpha + \beta x}\right)^{p^{2m}-p^m+1} = 1 \tag{4}$$

The conditional Expression 4 can be rewritten to a following Expression 5 using the above-described modulus "$f_2(x)=x^2-\delta$" of the quadratic extension.

$$\{\delta^{(p^{3m}-1)/2} - 1\}\left\{\frac{\alpha^{p^{2m}+p^m}}{\delta^{(p^{2m}+p^m)/2}}\beta + \frac{\alpha^{p^m+1}}{\delta^{(p^m+1)/2}}\beta^{p^{2m}} - \frac{\alpha^{p^{2m}+1}}{\delta^{(p^{2m}+1)/2}}\beta^{p^m} - \beta^{p^{2m}+p^m+1}\right\} = 0 \tag{5}$$

As a result of the condition under which the modulus $f_2(x)$ of the quadratic extension becomes irreducible, δ raised to the power of (p^3m−1)/2 does not become "1". In other words, a first term on a left-hand side of Expression 5 does not become "0". Therefore, a following Expression 6 in which a second term of the left-hand side becomes "0" is solved.

$$\frac{\alpha^{p^{2m}+p^m}}{\delta^{(p^{2m}+p^m)/2}}\beta + \frac{\alpha^{p^m+1}}{\delta^{(p^m+1)/2}}\beta^{p^{2m}} - \frac{\alpha^{p^{2m}+1}}{\delta^{(p^{2m}+1)/2}}\beta^{p^m} - \beta^{p^{2m}+p^m+1} = 0 \tag{6}$$

Here, when "δ≠0" with δ as the member of the extension field $F_{q^m}$, Expression 6 can be rewritten to a following Expression 7.

$$\left(\frac{\alpha}{\beta}\right)^{p^{2m}+p^m} + \left(\frac{\alpha}{\beta}\right)^{p^m+1} + \left(\frac{\alpha}{\beta}\right)^{p^{2m}+1} = -\delta \qquad (7)$$

Here, when "$\gamma=\alpha/\beta$" is substituted, Expression 7 can be rewritten to a following Expression 8.

$$\gamma^{p^{2m}+p^m} + \gamma^{p^m+1} + \gamma^{p^{2m}+1} = -\delta \qquad (8)$$

Moreover, $\gamma$ is defined by a following Expression 9 using y in the modulus of the cubic extension, described above.

$$\gamma = c_0 + c_1 y + c_2 y^2, c_i \in F_{p^m} \qquad (9)$$

Then, when Expression 8 is calculated using Expression 9, a term y that is a second term on a right-hand side of Expression 9 and a term $y^2$ that is a third term become "0". Only a first term remains. A following Expression 10 is obtained.

$$3c_0^2 - 3c_1 c_2 w = -\delta \qquad (10)$$

Here, when "$c_1 \neq 0$", $c_2$ can be calculated using $c_0$ and $c_1$. A following Expression 11 is obtained.

$$c_2 = \frac{c_0^2 + \delta/3}{c_1 w} \qquad (11)$$

Therefore, the member of $T_6(F_{q^m})$ is uniquely determined using $c_0$ and $c_1$. This is the affine representation. To convert the affine representation to the projective representation, $\psi(c_0,c_1)$ is calculated by a following Expression 12.

$$\psi(c_0, c_1) = \frac{c_0 c_1 w + c_1^2 wy + (c_0^2 + \delta/3)y^2 - c_1 wx}{c_0 c_1 w + c_1^2 wy + (c_0^2 + \delta/3)y^2 + c_1 wx} \qquad (12)$$

Further, when a denominator and a numerator on a right-hand side of Expression 12 is multiplied by "$w^{-1}$", a following Expression 13 is established.

$$\psi(c_0, c_1) = \frac{c_0 c_1 + c_1^2 y + (c_0^2 + \delta/3)w^{-1}y^2 - c_1 x}{c_0 c_1 + c_1^2 y + (c_0^2 + \delta/3)w^{-1}y^2 + c_1 x} \qquad (13)$$

When "$c_2 \neq 0$", $c_1$ can be calculated using $c_0$ and $c_2$. Therefore, the member of $T_6(F_{q^m})$ is uniquely determined using $c_0$ and $c_2$. When the affine representation determined in this way is returned to the projective representation, $\psi(c_0,c_2)$ is calculated by a following Expression 14.

$$\psi(c_0, c_2) = \frac{c_0 c_2 w + (c_0^2 + \delta/3)y + c_2^2 wy^2 - c_2 wx}{c_0 c_2 w + (c_0^2 + \delta/3)y + c_2^2 wy^2 + c_2 wx} \qquad (14)$$

Further, when a denominator and a numerator on a right-hand side of Expression 14 is multiplied by "$w^{-1}$", a following Expression 15 is established.

$$\psi(c_0, c_2) = \frac{c_0 c_2 + (c_0^2 + \delta/3)w^{-1}y + c_2^2 y^2 - c_2 x}{c_0 c_2 + (c_0^2 + \delta/3)w^{-1}y + c_2^2 y^2 + c_2 x} \qquad (15)$$

At the same time, that "$c_1=0$" does not occur is proven. To prove that $c_1$ does not equal 0, all that is required is to indicate that "$-\delta/3$" is a quadratic non-residue. From a condition under which a modulus "$f_2(x)=x^2-\delta$" of the quadratic extension, a modulus "$f_3(y)=y^3-w$" of the quadratic extension, and a modulus "$g_r(z)=z^r-s$" of an r-th degree extension are irreducible (refer to, for example, R. Lidl and H. Niederreiter, "Finite Fields", Vol. 20 of Encyclopedia of Mathematics and its Applications, Cambridge University Press, 1983; and D. V. Bailey and C. Paar, "Optimal Extension Fields for Fast Arithmetic in Public-key Algorithms", CRYPTO 1998, LNCS 1462, 472-485, 1998), when "3|m", "3|(p-1)" and "3|(p^m-1)".

First, whether "-3" is a quadratic residue or a quadratic non-residue in a prime field $F_q$ is determined. This can be determined by a following Expression 16 if a quadratic residue symbol, a first supplement to a law of quadratic reciprocity, and the law of quadratic reciprocity are used.

$$\left(\frac{-3}{p}\right) = \left(\frac{-1}{p}\right)\left(\frac{3}{p}\right) \qquad (16)$$
$$= (-1)^{(p-1)/2}(-1)^{(p-1)/2}\left(\frac{p\%3}{3}\right)$$
$$= \left(\frac{p\%3}{3}\right)$$

Here, "p %3" indicates a remainder of p divided by "3". "-3" is a quadratic residue when the remainder is "1". "-3" is a quadratic non-residue when the remainder is "2". When "p>2", "-3" is a quadratic residue when "3|(p-1)". "-3" is a quadratic non-residue when "3|(p-2)". When "-3" is a quadratic residue in the prime field $F_q$, "-3" is also a quadratic residue in the extension field $F_{q^m}$ because a following Expression 17 is established.

$$(-3)^{(p-1)/2} = 1 \Rightarrow (-3)^{(p^m-1)/2} = 1 \qquad (17)$$

A reverse of Expression 17 is not necessarily established. When "-3" is a quadratic non-residue in the prime field $F_q$, "-3" is a quadratic residue in the extension field $F_{q^m}$ when m can be divided by "2". When m cannot be divided by "2", "-3" is a quadratic non-residue even in the extension field $F_{q^m}$ because a following Expression 18 is established.

$$(-3)^{(p-1)/2} = -1 \Rightarrow (-3)^{(p^m-1)/2} = (-1)^m \qquad (18)$$

Moreover, when "-3" is a quadratic residue in the extension field $F_{q^m}$, "-$\delta$/3" is a quadratic non-residue in the extension field $F_{q^m}$ because $\delta$ is a quadratic non-residue in the extension field $F_{q^m}$. To obtain the algebraic torus $T_6(F_{q^m})$ that is a prime order, "m=2^a×3^b", Therefore, when "3|m", "3|(p-1)". In addition, "-3" is a quadratic residue in the extension field $F_{q^m}$. When "2|m", "-3" is a quadratic residue in the extension field $F_{q^m}$. Therefore, when an algebraic torus that is a prime order is considered, "-$\delta$/3" is always a quadratic non-residue in the extension field $F_{q^m}$.

Next, a configuration of an decompressing apparatus will be described. The decompressing apparatus is a representation converting apparatus performing decompression map such as that described above. The decompressing apparatus includes a controlling device, a storage device, an external storage device, and a communication interface (I/F). The controlling device, such as a central processing unit (CPU), controls an overall device. The storage device, such as a read-only memory (ROM) or a random access memory (RAM), stores various pieces of data and various programs. The external storage device, such as a hard disk drive (HDD) device or a compact disc (CD) drive device, stores various pieces of data and various programs. The communication I/F controls communication with an external device. The computing device also includes a bus that connects the controlling device, the storage device, the external storage device, and the communication I/F. An ordinary computer is used in a hardware configuration of the decompressing apparatus.

Figure 1:
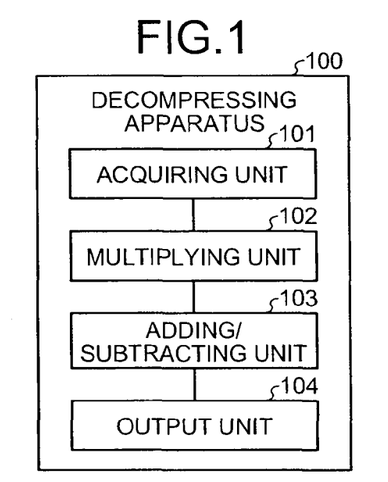
FIG. 1 is a diagram of an example of a functional configuration of a decompressing apparatus according to an embodiment of the present invention.

Various functions actualized in a hardware configuration, such as that described above, by the CPU in the decompressing apparatus running the various programs stored in the storage device and the external storage device will be described in detail. FIG. 1 is a diagram of an example of a functional configuration of an decompressing apparatus according to the embodiment. The decompressing apparatus 100 includes an acquiring unit 101, a multiplying unit 102, an adding/subtracting unit 103, and an output unit 104. Each unit is generated in the storage device, such as the RAM, when the CPU runs a program.

Function provided by each unit when "r=3" will be described. The acquiring unit 101 acquires a member $(c_0, c_1)$ represented by the affine representation of the algebraic torus $T_6(F_{q^m})$ that is a subject of decompression map. $c_0, c_1$ are each a member of the extension field $F_{q^m}$. The acquiring unit 101 can acquire the member by receiving the member from the external device, via the communication I/F. Alternatively, the acquiring unit 101 can acquire the member by reading out the member from a computer-readable recording medium, such as a compact disc read-only memory (CD-ROM), a flexible disk (FD), a compact disc-recordable (CD-R), and a digital versatile disk (DVD), in an installable format file or an executable format file. The acquiring unit 101 also acquires a system parameter w that decides a modulus of the quadratic extension and a system parameter δ that decides a modulus of the cubic extension. As described above, w and δ are members of the extension field $F_{q^m}$. The system parameter w and the system parameter δ can be stored in the external storage device in advance. Alternatively, the acquiring unit 101 can acquire the system parameter w and the system parameter δ from the external device, via the communication I/F.

The multiplying unit 102 performs following multiplication operations when decompression map is performed using the member $(c_0, c_1)$ of the algebraic torus $T_6(F_{q^m})$, the system parameter w, and the system parameter δ acquired by the acquiring unit 101. Here, decompression map is performed by the above-described Expression 13.

$$t_1 = c_0^2$$

$$t_2 = c_0 \times c_1$$

$$t_3 = c_1^2$$

$$a_2 = t_4 \times w^{\{-1\}}$$

The adding/subtracting unit 103 performs following addition operations using results of the multiplication operations performed by the multiplying unit 102 when decompression map is performed by the above-described Expression 13 using the member $(c_0, c_1)$ of the algebraic torus $T_6(F_{q^m})$, the system parameter w, and the system parameter δ acquired by the acquiring unit 101.

$$a_0 = t_2$$

$$a_1 = t_3$$

$$t_4 = t_1 + \delta/3$$

$$b_0 = c_1$$

$$b_1 = 0$$

$$b_2 = 0$$

"$w^{\{-1\}}$" and "δ/3" can be obtained by one of the multiplying unit 102 and the adding/subtracting unit 103 performing computation using the system parameter w and the system parameter δ acquired by the acquiring unit 101. However, "$w^{\{-1\}}$" and "δ/3" can be stored in the external storage device in advance, and acquired by the acquiring unit 101. The multiplying unit 102 and the adding/subtracting unit 103 can then use the acquired "$w^{\{-1\}}$" and "δ/3".

The output unit 104 outputs $(a_0, a_1, a_2, b_0, b_1, b_2)$ that is a set of member of the algebraic torus $T_2(F_{q^{3m}})$ ($a_j$ is a member of $F_q$ and $b_j$ is a member of $F_q$, where $0 \leq j \leq 2$) and represented by the projective representation, using the results of the multiplication operations performed by the multiplying unit 102 and results of the addition operations performed by the adding/subtracting unit 103.

Figure 2:
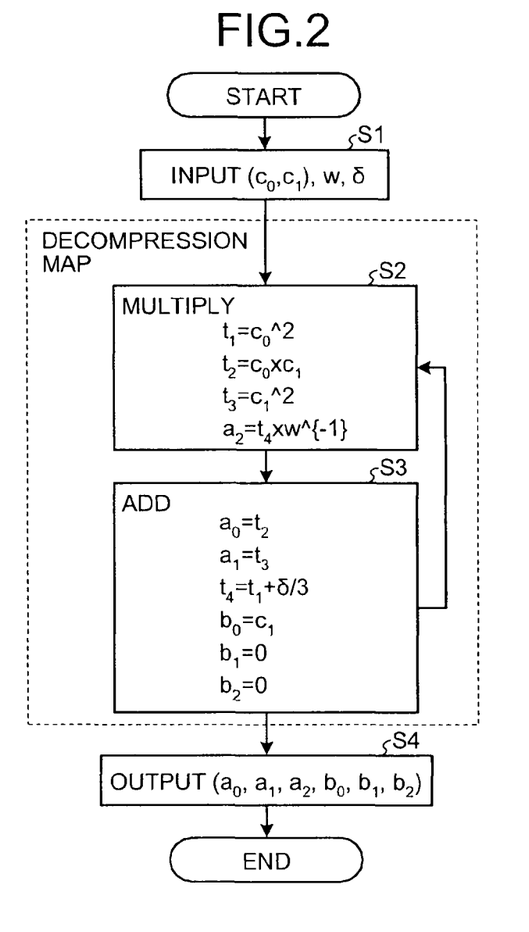
FIG. 2 is a flowchart of an decompression map process performed by an decompressing apparatus 100 according to the embodiment.

Next, an decompression map process performed by the decompressing apparatus 100 according to the embodiment will be described with reference to FIG. 2. The decompressing apparatus 100 acquires the member $(c_0, c_1)$ represented by the affine representation of the algebraic torus $T_6(F_{q^m})$ that is a subject of decompression map. The decompressing apparatus 100 also acquires the system parameter w that decides the modulus of the quadratic extension and the system parameter δ that decides the modulus of the cubic extension (Step S1). Then, the decompressing apparatus 100 performs the following multiplication operations using the member $(c_0, c_1)$ of the algebraic torus $T_6(F_{q^m})$, the system parameter w, and the system parameter δ acquired at Step S1. Here, decompression map is performed by the above-described Expression 13.

$$t_1 = c_0^2$$

$$t_2 = c_0 \times c_1$$

$$t_3 = c_1^2$$

$$a_2 = t_4 \times w^{\{-1\}}$$

The decompressing apparatus 100 performs the following addition operations using $c_1$ of the member $(c_0, c_1)$ of the algebraic torus $T_6(F_{q^m})$ and the system parameter δ acquired at Step S1, and the results of the multiplication operations performed at Step S2 (Step S3).

$$a_0 = t_2$$

$$a_1 = t_3$$

$$t_4 = t_1 + \delta/3$$

$$b_0 = c_1$$

$$b_1 = 0$$

$$b_2 = 0$$

In the manner described above, the decompressing apparatus 100 performs decompression map, and converts the member of the algebraic torus $T_6(F_{q^m})$ from the affine representation to the projective representation. The decompressing apparatus 100 then outputs $(a_0, a_1, a_2, b_0, b_1, b_2)$ that is a member of the algebraic torus $T_2(F_{q^{3m}})$ and represented by the projective representation, using the results of the multiplication operations performed at Step S2 and results of the addition operations performed at Step S3 (Step S4).

According to the embodiment, as a result of decompression map such as that described above being performed, the member of an algebraic torus can be converted from the affine representation to the projective representation. The calculation process can be performed even over an algebraic torus of a prime order after conversion. Moreover, the processing load can be reduced. The calculation process is, for example, an encryption process, a decryption process, a key generation process, and a hybrid encryption process, particularly KEM-Enc processing and DEM-Dec processing based on a key encapsulation mechanism-data encapsulation mechanism (KEM-DEM) framework, described hereafter. Multiplication operations and exponetiation operations, such as square calculations, included in the calculation process can be performed through projective representation.

On the other hand, RS decompression map described in "2. Description of the Related Art" can be performed by a following Expression 19 or Expression 20. However, the calculation process may not be performed over the algebraic torus of a prime order after conversion.

$$\psi(v_1, v_2) = \frac{1 + v_1 y + v_2(y^2 - 2) + f(v_1, v_2)x}{1 + v_1 y + v_2(y^2 - 2) + f(v_1, v_2)x^2}, \quad (19)$$

$$f(v_1, v_2) = 1 - v_1^2 + v_1 v_2$$

$$\psi(v_1, v_2) = \frac{\gamma + f(v_1, v_2)x}{\gamma - f(v_1, v_2)x}, \quad (20)$$

$$f(v_1, v_2) = (2v_1^2 + v_2^2 - v_1 v_2 + 2v_1 - 4v_2 - 3)/14$$

$$\gamma = f(v_1, v_2) + 1 + v_1 y + (2f(v_1, v_2) + v_2)(y^2 - 1)$$

Moreover, GPS decompression map described in "2. Description of the Related Art" can be performed by a following Expression 21. However, a suitable parameter cannot be found when m is retrieved under conditions imposed on an extension degree m to configure the algebraic torus of a prime order. Therefore, in actuality, the calculation process cannot be performed after decompression. The parameter may, of course, be present when an algebraic torus of a composite order is used.

$$\psi(a_1, a_2) = \frac{(1 + a_1^2 - a_2^2) + a_1 a_{2p} + a_2^2 p^2 - a_2 \sigma}{(1 + a_1^2 - a_2^2) + a_1 a_{2p} + a_2^2 p^2 + a_2 \sigma} \quad (21)$$

Figure 3:
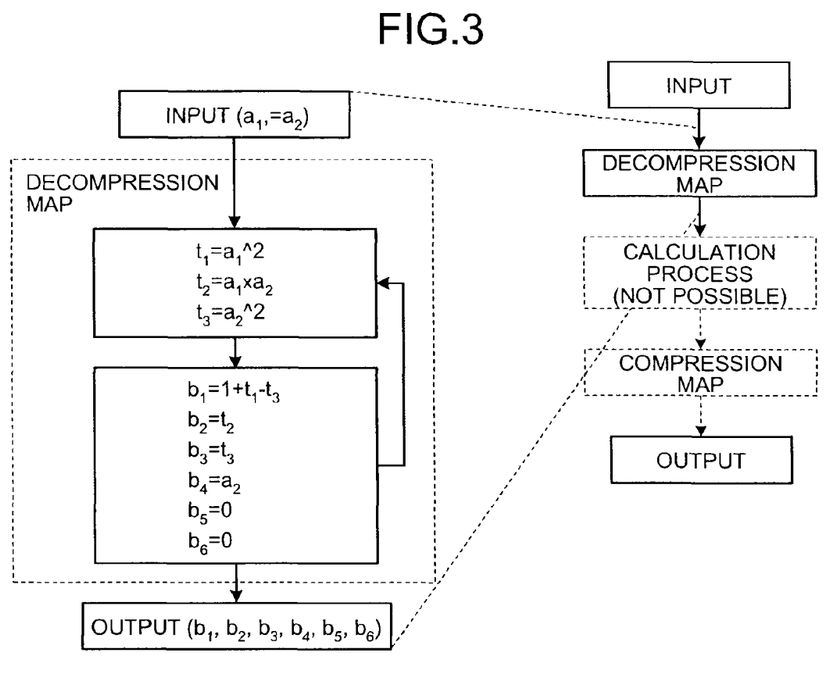
FIG. 3 is a diagram of an example of an overview of GPS decompression map.

Here, a simple overview of the GPS decompression map will be described with reference to FIG. 3. An member $(a_1, a_2)$ that is a member of the algebraic torus $T_6(F_{q^m})$ and represented by the affine representation is inputted into an decompressing apparatus performing the GPS decompression map. $a_1$ and $a_2$ are each a member of the extension field $F_{q^m}$. The decompressing apparatus performs following calculation operations as decompression map.

$t_1 = a_1^2$ $t_2 = a_1 \times a_2$ $t_3 = a_2^2$ $b_1 = 1 + t_1 - t_3$ $b_2 = t_2$ $b_3 = t_3$ $b_4 = a_2$ $b_5 = 0$ $b_6 = 0$ $(b_1, b_2, b_3, b_4, b_5, b_6)$ obtained from the calculation operations is a projective representation representing a member of an algebraic torus. When the parameter is present when the algebraic torus of a composite order is used, the calculation process can be performed in the projective representation. Alternatively, the calculation process can be performed in the extension field representation after the projective representation is further converted to the extension field representation. However, the calculation process after conversion from the affine representation to the projective representation cannot be performed over the algebraic torus of a prime order.

Figure 4:
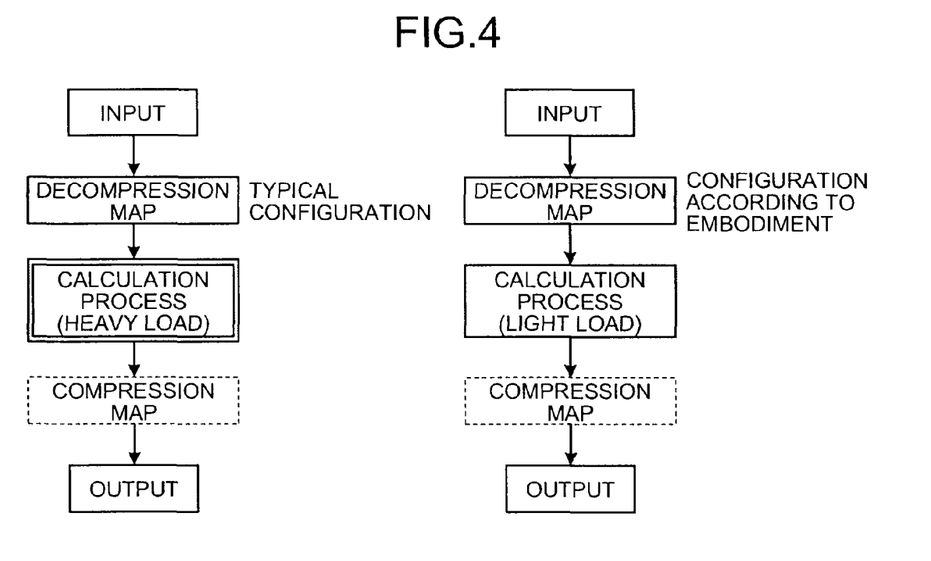
FIG. 4 is a diagram of an example of a comparison between effects achieved by a conventional configuration and a configuration according to the embodiment.

When a common decompression map method other than the above-described RS decompression map and GPS decompression map is used, the calculation process can be performed after the conversion from the affine representation to the projective representation. However, as in a comparison shown in FIG. 4, for example, the processing load is greater compared to decompression map according to the embodiment. On the other hand, in the configuration according to the embodiment, the calculation process can be performed over the algebraic torus of a prime order after conversion from the affine representation to the projective representation. In addition, the processing load of the calculation process after conversion can be reduced compared to a conventional processing load.

Figure 5:
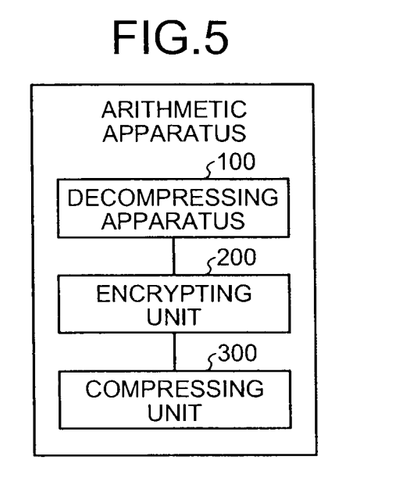
FIG. 5 is a diagram of an example of a configuration of an arithmetic apparatus performing an encryption process according to the embodiment.

Next, an example in which the decompressing apparatus according to the embodiment is applied to an arithmetic apparatus will be described. FIG. 5 is a diagram of an example of a configuration of an arithmetic apparatus that performs the encryption process as the calculation process after the conversion from the affine representation to the projective representation. The arithmetic apparatus includes the decompressing apparatus 100, an encrypting unit 200, and a compressing unit 300. The decompressing apparatus 100 is configured as described above. Here, the member $(c_0, c_1)$ of the algebraic torus $T_6(F_{q^m})$ that is acquired by the decompressing apparatus and is the subject of decompression map is plain data. The encrypting unit 200 acquires $(a_0, a_1, a_2, b_0, b_1, b_2)$ outputted by the decompressing apparatus 100 after performing decompression map, and a public key. The encryption section 200 performs the encryption process using the acquired $(a_0, a_1, a_2, b_0, b_1, b_2)$ and the public key, and outputs a encrypted data. The encryption process performed here is a calculation process determined by the above-described modulus "$f_2(x) = ^2 - \delta$" and base $\{1, x\}$ of the quadratic extension, and modulus "$f_3(y) = y^3 - w$" and base $\{1, y, y^2\}$ of the cubic extension. The compressing unit 300 performs compression map on the encrypted data outputted by the encrypting unit 200, and outputs a compressed encrypted data.

The decompressing apparatus 100, the encrypting unit 200, and the compressing unit 300 can each be a separate device including a CPU and a storage device. Alternatively, the arithmetic apparatus can include the CPU, the storage device, the external storage device, and the communication I/F described earlier in the description the hardware configuration of the decompressing apparatus 100. Each function provided by the decompressing apparatus 100, the encrypting unit 200, and the compressing unit 300 can be actualized by the CPU running the various programs stored in the storage device and the external device. The arithmetic apparatus can transmit the compressed encrypted data outputted by the compressing unit 300 to the external device, via the communication I/F. Alternatively, the arithmetic apparatus can be configured to not include the compressing unit 300 and can transmit the encrypted data outputted by the encrypting unit 200 to the external device, via the communication I/F.

According to a configuration such as that described above, the encryption process can be performed even over the algebraic torus of a prime order after conversion from the affine representation to the projective representation. In addition, processing load of the encryption process can be reduced.

Figure 6:
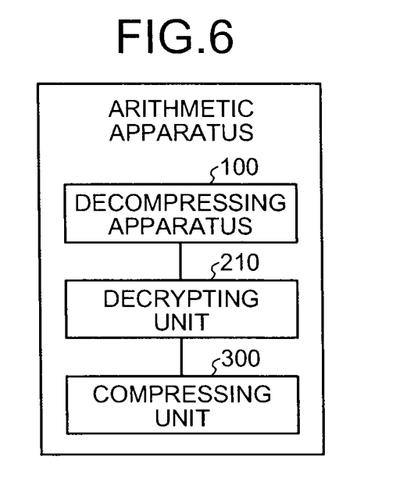
FIG. 6 is a diagram of an example of a configuration of an arithmetic apparatus performing a decryption process according to the embodiment.

FIG. 6 is a diagram of an example of a configuration of an arithmetic apparatus that performs the decryption process as the calculation process after the conversion from the affine representation to the projective representation. The arithmetic apparatus includes the decompressing apparatus 100, a decrypting unit 210, and the compressing unit 300. The decompressing apparatus 100 is configured as described above. Here, the member $(c_0, c_1)$ of the algebraic torus $T_6(F_{q^m})$ that is acquired by the decompressing apparatus and is the subject of decompression map is encrypted data. The decrypting unit 210 acquires $(a_0, a_1, a_3, b_0, b_1, b_2)$ outputted by the decompressing apparatus 100 after decompression map, and a secret key. The decrypting unit 210 performs the decryption process using the acquired $(a_0, a_1, a_2, b_0, b_1, b_2)$ and the secret key, and outputs a plain data. The decryption process performed here is a calculation process determined by the above-described modulus "$f_2(x)=x^2-\delta$" and base $\{1,x\}$ of the quadratic extension, and modulus "$f_3(y)=y^3-w$" and base $\{1, y, y^2\}$ of the cubic extension. The compressing unit 300 performs compression map on the plain data outputted by the decrypting unit 210, and outputs a compressed plain data.

The decompressing apparatus 100, the decrypting unit 210, and the compressing unit 300 can each be a separate device including a CPU and a storage device. Alternatively, the arithmetic apparatus can include the CPU, the storage device, the external storage device, and the communication I/F described earlier in the description the hardware configuration of the decompressing apparatus 100. Each function provided by the decompressing apparatus 100, the decrypting unit 210, and the compressing unit 300 can be actualized by the CPU running the various programs stored in the storage device and the external device. Alternatively, the arithmetic apparatus can be configured to not include the compressing unit 300.

According to a configuration such as that described above, the decryption process can be performed even over the algebraic torus of a prime order after conversion from the affine representation to the projective representation. In addition, processing load of the decryption process can be reduced.

Figure 7:
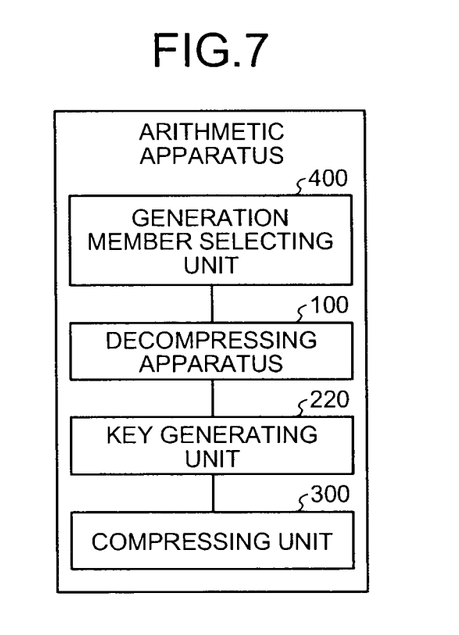
FIG. 7 is a diagram of an example of a configuration of an arithmetic apparatus performing a key generation process according to the embodiment.

FIG. 7 is a diagram of an example of a configuration of an arithmetic apparatus that performs the key generation process as the calculation process after the conversion from the affine representation to the projective representation. The arithmetic apparatus includes a generation member selecting unit 400, the decompressing apparatus 100, a key generating unit 220, and the compressing unit 300. The generation member selecting unit 400 randomly selects a member of the algebraic torus $T_6(F_{q^m})$ as a generation member. The decompressing apparatus 100 is configured as described above. Here, the member $(c_0, c_1)$ of the algebraic torus $T_6(F_{q^m})$ that is acquired by the decompressing apparatus and is the subject of decompression map is that selected by the generation member selecting unit 400 as the generation member. The key generating unit 220 acquires $(a_0, a_1, a_2, b_0, b_1, b_2)$ outputted by the decompressing apparatus 100 after performing decompression map, and each secret key component randomly selected as secret key components. The key generating unit 220 performs the key generation process using the acquired $(a_0, a_1, a_2, b_0, b_1, b_2)$ and the secret key components and determines each public key component serving as each key component of a public key. The key generating unit 220 then outputs the public key and the secret key. The key generation process performed here is a calculation process determined by the above-described modulus "$f_2(x)=x^2-\delta$" and base $\{1,x\}$ of the quadratic extension, and modulus "$f_3(y)=y^3-w$" and base $\{1, y, y^2\}$ of the cubic extension. The compressing unit 300 performs compression map on the public key and the secret key outputted by the key generating unit 220, and outputs compressed keys.

The generation member selecting unit 400, the decompressing apparatus 100, the key generating unit 220, and the compressing unit 300 can each be a separate device including a CPU and a storage device. Alternatively, the arithmetic apparatus can include the CPU, the storage device, the external storage device, and the communication I/F described earlier in the description the hardware configuration of the decompressing apparatus 100. Each function provided by the generation member selecting unit 400, the decompressing apparatus 100, the key generating unit 220, and the compressing unit 300 can be actualized by the CPU running the various programs stored in the storage device and the external device. Alternatively, the arithmetic apparatus can be configured to not include the compressing unit 300.

According to a configuration such as that described above, the key generation process can be performed even over the algebraic torus of a prime order after conversion from the affine representation to the projective representation. In addition, processing load of the key generation process can be reduced.

Figure 8:
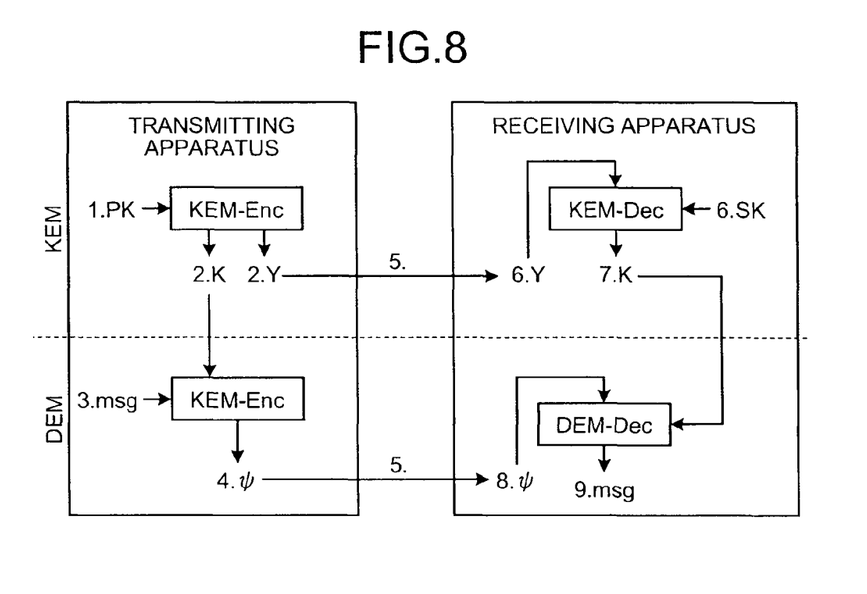
FIG. 8 is a schematic diagram of public key encryption and data encryption based on a KEM-DEM framework.

FIG. 8 is a schematic diagram of encryption of a common key and encryption of data based on the KEM-DEM framework. The KEM-DEM framework refers to a type of hybrid encryption that encrypts data using common key encryption and encrypts a key for the common key encryption using public key encryption (refer to, for example, R. Cramer and V. Shoup, "Design and analysis of practical public-key encryption schemes secure against adaptive encrypted data attack", SIAM Journal on Computing, 33(1): 167-226, 2003).

In FIG. 8, PK indicates a public key belonging to a group G. k indicates a key for common key encryption. Y indicates a encrypted data in public key encryption belonging to the group G. SK indicates a secret key for public key encryption. msg indicates data encrypted by common key encryption. ψ indicates a encrypted data in common key encryption. In the KEM-DEM framework, when the public key PK is inputted into KEM-Enc in a transmitting device, the transmitting device generates the key k for common key encryption and performs decompression map on the generated key k. Next, the transmitting device performs a KEM encryption process as the encryption process on the public key PK, using the decompressed key k. The transmitting device then obtains a encrypted data of the public key. The transmitting device compresses the encrypted data of the public key and transmits the compressed encrypted data to a receiving device as the compressed encrypted data Y of the public key. When the key k and the data msg for common key encryption are inputted in the transmitting device, the transmitting device performs a DEM encryption process using the inputted key k and data msg, and obtains the encrypted data ψ in common key encryption. The transmitting device then transmits the encrypted data ψ to the receiving device.

On the other hand, when the encrypted data Y and the secret key SK for public key encryption are inputted in KEM-Dec in the receiving device, the receiving device performs decompression map on the compressed encrypted data Y of the public key. Then, the receiving device performs a KEM decryption process as the decryption process using the decompressed encrypted data Y of the public key, and obtains the key k for common key encryption. Output from the KEM-Dec does not include that which serves as a member of a prime order subgroup G. Therefore, the compression process is not required here. When the key k for common key encryption and the encrypted data ψ in common key encryption are inputted in the DEM-Dec in the receiving device, the receiving deice performs a DEM decryption process as the decryption process, and decrypts the data msg.

Figure 9:
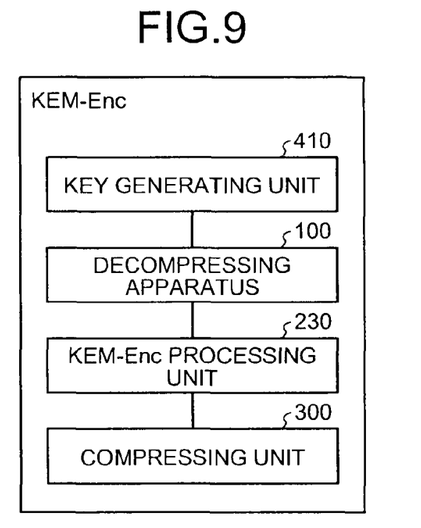
FIG. 9 is a diagram of an example of a configuration of a KEM-Enc serving as an arithmetic apparatus according to the embodiment.

FIG. 9 is a diagram of an example of a configuration of the KEM-Enc serving as the arithmetic apparatus. The KEM-Enc includes a key generating unit 410, the decompressing apparatus 100, a KEM-Enc processing unit 230, and the compressing unit 300. When the public key PK is inputted, the key generating unit 410 generates the key k for common key encryption using the inputted public key PK. The decompressing apparatus 100 is configured as described above. Here, the member $(c_0, c_1)$ of the algebraic torus $T_6(F_{q^m})$ that is acquired by the decompressing apparatus and is the subject of decompression map is the key k for common key encryption generated by the key generating unit 410. The KEM-Enc processing unit 230 performs the KEM encryption process on the public key PK using $(a_0, a_1, a_2, b_0, b_1, b_2)$ outputted by the decompressing apparatus 100 after decompression map, and outputs the encrypted data of the public key. The KEM encryption process performed here is a calculation process determined by the above-described modulus "$f_2(x)=x^2-\delta$" and base $\{1, x\}$ of the quadratic extension, and modulus "$f_3(y)=y^3-w$" and base $\{1, y, y^2\}$ of the cubic extension. The compressing unit 300 performs compression map on the encrypted data of the public key outputted by the KEM-Enc processing unit 230, and outputs the compressed encrypted data Y of the public key.

The key generating unit 410, the decompressing apparatus 100, the KEM-Enc processing unit 230, and the compressing unit 300 can each be a separate device including a CPU and a storage device. Alternatively, the KEM-Enc can include the CPU, the storage device, the external storage device, and the communication I/F described earlier in the description the hardware configuration of the decompressing apparatus 100. Each function provided by the key generating unit 410, the decompressing apparatus 100, the KEM-Enc processing unit 230, and the compressing unit 300 can be actualized by the CPU running the various programs stored in the storage device and the external device.

Figure 10:
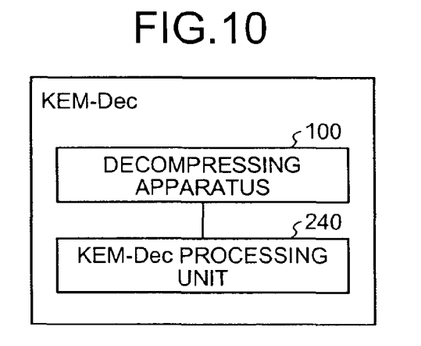
FIG. 10 is a diagram of an example of a configuration of a KEM-Dec serving as an arithmetic apparatus according to the embodiment.

FIG. 10 is a diagram of an example of a configuration of the KEM-Dec serving as the arithmetic apparatus. The KEM-Dec includes the decompressing apparatus 100 and a KEM-Dec processing unit 240. The decompressing apparatus 100 is configured as described above. Here, the member $(c_0, c_1)$ of the algebraic torus $T_6(F_{q^m})$ that is acquired by the decompressing apparatus and is the compressed encrypted data Y of the public key outputted by the above-described KEM-Enc. The KEM-Dec processing unit 240 performs the KEM decryption process on the encrypted data y of the public key using $(a_0, a_1, a_2, b_0, b_1, b_2)$ outputted by the decompressing apparatus 100 after decompression map, and the secret key SK for common key encryption. The KEM-Dec processing unit 240 then obtains the key k for common key encryption. The KEM decryption process performed here is a calculation process determined by the above-described modulus "$f_2(x)=x^2-\delta$" and base $\{1, x\}$ of the quadratic extension, and modulus "$f_3(y)=y^3-w$" and base $\{1, y, y^2\}$ of the cubic extension.

The decompressing apparatus 100 and the KEM-Dec processing unit 240 can each be a separate device including a CPU and a storage device. Alternatively, the KEM-Dec can include the CPU, the storage device, the external storage device, and the communication I/F described earlier in the description the hardware configuration of the decompressing apparatus 100. Each function provided by the decompressing apparatus 100 and the KEM-Dec processing unit 240 can be actualized by the CPU running the various programs stored in the storage device and the external device.

In a configuration such as that described above, in the KEM-DEM framework, the KEM encryption process and the KEM decryption process can be performed even on the algebraic torus of a prime order after conversion from the affine representation to the projective representation. In addition, processing loads of the KEM encryption process and the KEM decryption process can be reduced.

Through application of Cramer-Shoup cryptosystem, the KEM-Enc processing unit 230 can perform the KEM encryption process based on the Cramer-Shoup cryptosystem. The KEM-Dec processing unit 240 can perform the KEM decryption process based on the Cramer-Shoup cryptosystem.

Next, an example will be described in which the decompressing apparatus 100 according to the embodiment is applied particularly to the encryption process and the decryption process in torus-based Cramer-Shoup encryption, serving as the encryption process and the decryption process that are calculation processes. A configuration of the arithmetic apparatus performing an encryption process such as that in the torus-based Cramer-Shoup encryption is similar to the configuration shown in FIG. 5. Therefore, a drawing of the configuration is omitted. Unique functions actualized in the torus-based Cramer-Shoup encryption by the decompressing apparatus 100, the encrypting unit 200, and the compressing unit 300, shown in FIG. 5, will be described. A public key (q, g, g~, e, f, h) and a plain data msg are inputted into the arithmetic apparatus. The key (q, g, g~, e, f, h) and the plain data msg are each a member of the algebraic torus $T_6(F_{q^m})$ and represented by the affine representation. The decompressing apparatus 100 respectively performs decompression map, in a manner similar to that described above, on each public key component q, g, g~, e, f, and h included in the public key (q, g, g~, e, f, h) represented by the affine representation, thereby converting each public key component to the projective representation. Here, the projective representation of each public key component is respectively written as q*, g*, g~*, e*, f*, and h*. After acquiring public key (q*, g*, g~*, e*, f*, h*) represented by the projective representation and the plain data msg, the encrypting unit 200 first generates a random number u. Next, the encrypting unit 200 obtains "g*^u" as a component c1 of a encrypted data, obtains "g~*^u" as a component c2 of the encrypted data, and obtains "h*^u" as a coefficient b, using the public key components g*, g~*, and h*. The decompressing apparatus 100 performs decompression map, in a manner similar to that described above, on the plain data msg represented by the affine representation, and converts the plain data msg to the projective representation. Here, the projective representation of the plain data msg is written as msg*. The encrypting unit 200 performs plain data masking by obtaining "msg*×b" as a component c3 of the encrypted data using the coefficient b and the plain data msg* represented by the projective representation. Furthermore, the encrypting unit 200 performs computation using a hash function, using the obtained components c1, c2, and c3 of the encrypted data, thereby obtaining a hash value v. The encrypting unit 200 then obtains "e*^u×f*^uv" as a component c4 of the encrypted data using the public key components e* and f*, the random number u, and the hash value v. The compressing unit 300 performs compression map on the components c1, c2, c3, and c4 of the encrypted data represented by the projective representation, and converts each component to the affine representation. Here, the affine representation of each component c1, c2, c3, and c4 of the encrypted data is written as c1*, c2*, c3*, and c4*. An obtained (c1*, c2*, c3*, c4*) serves as a compressed encrypted data. The compressed encrypted data is transmitted to an arithmetic apparatus that performs the decryption process on the compressed encrypted data.

Next, the arithmetic apparatus that performs the decryption process on the compressed encrypted data (c1*, c2*, c3*, c4*) will be described. A configuration of the arithmetic apparatus is similar to the configuration shown in FIG. 6. Therefore, a drawing of the configuration is omitted. Unique functions actualized in the torus-based Cramer-Shoup encryption by the decompressing apparatus 100, the decrypting unit 210, and the compressing unit 300, shown in FIG. 6, will be described. A secret key (w, x, y, z) corresponding to the public key (q, g, g~, e, f, h) and (c1*, c2*, c3*, c4*) represented by the affine representation are inputted into the arithmetic apparatus. Each component c1*, c2*, and c3* of the compressed encrypted data is a member of the algebraic torus $T_6(F_{q^m})$ and is represented by the affine representation. The decompressing apparatus 100 performs decompression map, in a manner similar to that described above, on each component c1*, c2*, and c3* of the compressed encrypted data, and converts each component c1*, c2*, and c3* to the projective representation. Each component c1*, c2*, and c3* represented by the projective representation is obtained. The decrypting unit 210 performs computation using a hash function, using the components c1*, c2*, and c3* of the compressed encrypted data, thereby obtaining a hash value v. The decrypting unit 210 obtains "c1*^w" as a coefficient t1 and "c1^(x+y×v)" as a coefficient t2 using the component c1* of the compressed encrypted data, secret key components z1 and z2, and the hash value v. The compressing unit 300 performs compression map on the coefficient t2 obtained by the decrypting unit 210, and converts the coefficient t2 from the projective representation to the affine representation. Here, the affine representation of the coefficient t2 is written as t2*. When "c2=t1" and "c4*=t2*" are established using the coefficients t1 and t2*, the component c2 of the encrypted data, and the component c4* of the compressed encrypted data, the decrypting unit 210 uses the component c1 of the encrypted data and a component z of the secret key to obtain "c1^z" as the coefficient b. The decrypting unit 210 then obtains "c3× b^(-1)" as the plain data msg using an inverse member "b^(-1)" of the obtained coefficient b and the component c3 of the encrypted data.

In a configuration such as that described above, in the torus-based Cramer-Shoup encryption, the encryption process and the decryption process can be performed on the algebraic torus of a prime order. In addition, processing loads of the encryption process and the decryption process can be reduced.

The present invention is not limited to the above-described embodiment. Constituent members can be modified and specified in practice without departing from the scope of the present invention. Various inventions can be achieved through appropriate combinations of a plurality of constituent members disclosed according to the embodiment. For example, some constituent members can be eliminated from the overall constituent members indicated according to the embodiment. Moreover, combinations of constituent members according to different embodiments can be used accordingly. Various modifications such as the following examples can be made.

According to above-described embodiment, various programs run in the decompressing apparatus 100 can be stored on a computer connected to the decompressing apparatus 100 over a network, such as the Internet. The stored programs can be provided by being downloaded over the network. Alternatively, the various programs can be provided stored on a computer-readable recording medium, such as a compact disc read-only memory (CD-ROM), a flexible disk (FD), a compact disc-recordable (CD-R), and a digital versatile disk (DVD), in an installable format file or an executable format file. In this case, the decompressing apparatus 100 reads a program from the recording medium and runs the program, thereby loading the program onto a storage device (such as the RAM). Various sections of the above-described functional configuration are generated in the storage device. The same applies to the arithmetic apparatus, the KEM-Enc, and the KEM-Dec.

According to the above-described embodiment, a same member is expressed even when each term of the projective representation ($a_0$, $a_1$, $a_2$, $b_0$, $b_1$, $b_2$) obtained as a result of decompression map by the decompressing apparatus 100 is multiplied by a constant d (d is a member of a finite field $F_q$). Therefore, each calculation process can be performed using $a_0 \times d$, $a_1 \times d$, $a_2 \times d$, $b_0 \times d$, $b_1 \times d$, $b_2 \times d$).

According to the above-described embodiment, the arithmetic apparatus can perform each calculation process in the projective representation. Alternatively, the arithmetic apparatus can perform each calculation process in the extension field representation.

The decompressing apparatus 100 can further include a converting unit that further converts the projective representation, converted from the affine representation, to the extension field representation. In other words, after converting the affine representation ($c_0, c_1$) of the member of the algebraic torus to the projective representation expressed by Expression 3, the decompressing apparatus 100 converts the projective representation to the extension field representation "α'+ β'x". As a result, the decompressing apparatus 100 calculates α and β from $c_0$ and $c_1$ using following Expression 22 and Expression 23.

$$\alpha = c_0 c_1 + c_1^2 y + (c_0^2 + \delta/3) w^{-1} y^2 \qquad (22)$$

$$\beta = c_1 \qquad (23)$$

Next, the decompressing apparatus 100 calculates α' and β' from α and β using a following Expression 24.

$$(\alpha', \beta') = \left( \frac{\alpha^2 + \delta\beta^2}{\alpha^2 - \delta\beta^2}, -\frac{2\alpha\beta}{\alpha^2 - \delta\beta^2} \right) \qquad (24)$$

Alternatively, rather than performing the conversion to the projective representation in this way between the conversion from the affine representation to the extension field representation, the decompressing apparatus 100 can convert the affine representation to the extension field representation. In this instance, the decompressing apparatus 100 calculates γ using a following Expression 25, with "γ=α/β" when "$c_1 \neq 0$".

$$\gamma = c_0 + c_1 y + (c_0^2 + \delta/3) w^{-1} c_1^{-1} y^2 \qquad (25)$$

Next, the decompressing apparatus 100 calculates α' and β' from γ using a following Expression 26.

$$(\alpha', \beta') = \left( \frac{\gamma^2 + \delta}{\gamma^2 - \delta}, -\frac{2\gamma}{\gamma^2 - \delta} \right) \qquad (26)$$

When "$c_1 = 0$", α' and β' are each "0".

In a configuration such as this, the arithmetic apparatus can perform each calculation process in the extension field representation using the member converted to the extension field representation by the decompressing apparatus 100.

According to the above-described embodiment, when "r=3" is described. However, a value of r is not limited to 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A representation converting apparatus for public key cryptography that converts data of a set of members represented by an affine representation representing a 2r-th degree algebraic torus $T_{2r}(F_q)$ (r is a prime number, and q is an integer) to data of a set of members represented by a projective representation representing a quadratic algebraic torus $T_2(F_{q^r})$, the apparatus comprising:

an acquiring unit that acquires data of a set of members of the 2r-th degree algebraic torus $T_{2r}(F_q)$ represented by the affine representation, the acquired set being ($c_0$, $c_1$, ..., $c_{r-2}$) ($c_i$ is a member of a finite field $F_q$, where $0 \leq i \leq r-2$); a non-transitory memory that stores acquired data of the set;

a multiplying unit that performs a multiplication operation on the acquired data of the set, the multiplication operation being determined by a condition under which the set of the quadratic algebraic torus $T_2(F_{q^r})$ is included in the 2r-th degree algebraic torus $T_{2r}(F_q)$, a modulus and a base of a quadratic extension, and a modulus and a base of an r-th degree extension;

an adding/subtracting unit that performs an addition and subtraction operation determined by the condition, the moduli, and the bases, and therefore obtains data of a set of members of the quadratic algebraic torus $T_2(F_{q^r})$ represented by the projective representation, the obtained data of the set being ($a_0$, $a_1$, ..., $a_{r-1}$, $b_0$, $b_1$, ..., $b_{r-1}$) ($a_j$ is a member of $F_q$ and $b_j$ is a member of $F_q$, where $0 \leq j \leq r-1$); and an output unit that outputs the obtained set, wherein x is a member added during a quadratic extension from an extension field $F_{q^r}$ to an extension field $F_{q^{2r}}$, and the modulus of the quadratic extension is "$f_2(x)=x^2-\delta$" and the base of the quadratic extension is $\{1,x\}$, $\delta$ being a member of the finite field $F_q$.

2. The apparatus according to claim 1, wherein "$\alpha=(a_0, a_1, \ldots, a_{r-1})$" is a set of members of the extension field $F_{q^r}$ and "$\beta=(b_0, b_1, \ldots, b_{r-1})$" is a set of members of the extension field $F_{q^r}$, the condition under which the set of the quadratic algebraic torus $T_2(F_{q^r})$ is included in the 2r-th degree algebraic torus $T_{2r}(F_q)$ is to satisfy a conditional expression "$(\alpha+\beta x)^{\Phi 2r(q)}=1$" ($\Phi n(q)$ is a polynomial equally dividing a circumference n), and the multiplying unit performs a multiplication operation on the acquired data of the set, the multiplication operation being determined by the conditional expression, the modulus, and the base of the quadratic extension, and the modulus and the base of the r-th degree extension.

3. The apparatus according to claim 1, wherein y is a member added during an r-th degree extension from an extension field $F_q$ to an extension field $F_{q^r}$, w is a member of the extension field $F_q$, a modulus of a cubic extension is "$fr(y)=y^r-w$" and a base of the r-th extension is $\{1, y, \ldots, y^{(r-1)}\}$, and the multiplying unit performs a multiplication operation on the acquired data of the set, the multiplication operation being determined by the condition, the modulus and the base of the quadratic extension, and the modulus and the base of the r-th extension.

4. The apparatus according to claim 1, wherein "r=3", ($c_0$,$c_1$) is a member of a sixth degree algebraic torus $T_6(F_q)$ represented by the affine representation, ($a_0$, $a_1$, $a_2$, $b_0$, $b_1$, $b_2$) is a set of members of a quadratic algebraic torus $T_2(F_{q^3})$ represented by the projective representation, a condition under which the set of the quadratic algebraic torus $T_2(F_{q^3})$ is included in the sixth degree algebraic torus $T_6(F_q)$ is to satisfy a conditional expression "$(\alpha+\beta x)^{q^2-q+1}=1$", the acquiring unit acquires ($c_0$,$c_1$), the multiplying unit performs a multiplication operation on the acquired data of the set, the multiplication operation being determined by the conditional expression, the modulus, and the base of the quadratic extension, and the modulus and the base of the cubic degree extension, and the output unit outputs ($a_0$, $a_1$, $a_2$, $b_0$, $b_1$, $b_2$).

5. The apparatus according to claim 4, wherein when "$\alpha/\beta=\gamma$", where "$\beta \neq 0$", the condition under which the set of the quadratic algebraic torus $T_2(F_{q^3})$ is included in the sixth degree algebraic torus $T_6(F_q)$ is to satisfy a conditional expression "$\gamma^{(q^2+q)}+\gamma^{(q+1)}+\gamma^{(q^2+1)}=-\delta$", the multiplying unit performs a multiplication operation on the acquired data of the set, the multiplication operation being determined by the conditional expression, the modulus and the base of the quadratic extension, and the modulus and the base of the cubic extension.

6. The apparatus according to claim 5, wherein the multiplying unit calculates $t_1=c_0 \times c_1 \times d$ (d is an arbitrary member of the finite field $F_q$)

$t_2=c_1^2 \times d$ (^ indicates exponentiation)

$t_3=c_0^2$ $a_2=t_4 \times w^{-1} \times d$ $t_5=c_1 \times d$, and the adding/subtracting unit calculates $a_0=t_1$ $a_1=t_2$ $t_4=t_3+\delta/3$ $b_0=t_5$ $b_1=0$ $b_2=0$.

7. The apparatus according to claim 5, wherein the multiplying unit calculates $t_1=c_0 \times c_1$ $t_2=c_1^2$ (^ indicates exponentiation)

$t_3=c_0^2$ $a_2=t_4 \times w^{-1}$, and the adding/subtracting unit calculates $a_0=t_1$ $a_1 = t_2$ $t_4 = t_3 + \delta/3$ $b_0 = c_1$ $b_1 = 0$ $b_2 = 0$.

8. The apparatus according to claim 5, wherein the multiplying unit calculates $t_1 = c_0 \times c_2 \times d$ (d is an arbitrary member of the finite field $F_q$)

$t_2 = c_2\hat{\ }2 \times d$ (^ indicates exponentiation)

$t_3 = c_0\hat{\ }2$ $a_1 = t_4 \times w\hat{\ }\{-1\} \times d$ $t_5 = c_2 \times d$, and the adding/subtracting unit calculates $a_0 = t_1$ $a_2 = t_2$ $t_4 = t_3 + \delta/3$ $b_0 = t_5$ $b_1 = 0$ $b_2 = 0$.

9. The apparatus according to claim 5, wherein the multiplying unit calculates $t_1 = c_0 \times c_2$ $t_2 = c_2\hat{\ }2$ (^ indicates exponentiation)

$t_3 = c_0\hat{\ }2$ $a_1 = t_4 \times w\hat{\ }\{-1\}$, and the adding/subtracting unit calculates $a_2 = t_2$ $t_4 = t_3 + \delta/3$ $b_0 = c_2$ $b_1 = 0$ $b_2 = 0$.

10. An arithmetic apparatus for public key cryptography that performs calculation after conversion from data of a set of members represented by an affine representation representing a 2r-th degree algebraic torus $T_{2r}(F_q)$ (r is a prime number, and q is an integer) to data of a set of members represented by a projective representation representing a quadratic algebraic torus $T_2(F_{q^r})$, the apparatus comprising:

an acquiring unit that acquires data of a set of members of the 2r-th degree algebraic torus $T_{2r}(F_q)$ represented by the affine representation, the acquired set being ($c_0$, $c_1$, ..., $c_{r-2}$) ($c_i$ is a member of a finite field $F_q$, where $0 \leq i \leq r-2$);

a non-transitory memory that stores the acquired data of the set;

a multiplying unit that performs a multiplication operation on the acquired data of the set, the multiplication operation being determined by a condition under which the set of the quadratic algebraic torus $T_2(F_{q^r})$ is included in the 2r-th degree algebraic torus $T_{2r}(F_q)$, a modulus ($f_2(x) = x\hat{\ }2 - \delta$) and a base $\{1, x\}$ of a quadratic extension, and a modulus and a base of an r-th degree extension, $\delta$ being a member of the finite field $F_q$;

an adding/subtracting unit that performs an addition and subtraction operation determined by the condition, the moduli, and the bases, and therefore obtains data of a set of members of the quadratic algebraic torus $T_2(F_{q^r})$ represented by the projective representation, the obtained data of the set being ($a_0$, $a_1$, ..., $a_{r-1}$, $b_0$, $b_1$, ..., $b_{r-1}$) ($a_j$ is a member of $F_q$ and $b_j$ is a member of $F_q$, where $0 \leq j \leq r-1$); and a calculating unit that performs calculation based on the obtained data of the set, the calculation being determined by the modulus and the base of the quadratic extension and the modulus and the base of the r-th degree extension.

11. The apparatus according to claim 10, further comprising:

a compressing unit that compresses the obtained data of the set on which the calculation is performed by converting the obtained data of the set to the affine representation.

12. The apparatus according to claim 10, wherein the calculating unit performs the calculation in the projective representation using the obtained data of the set represented by the projective representation.

13. The apparatus according to claim 10, further comprising:

a converting unit that converts the obtained data of the set represented by the projective representation to a set of members represented by an extension field representation, wherein the calculating unit performs the calculation in the extension field representation on the obtained data of the set represented by the extension field representation.

14. The apparatus according to claim 10, wherein the calculating unit includes an acquiring unit that acquires a public key and plain data that is the obtained data of the set represented by the projective representation, an encrypting unit that encrypts the plain data based on a public key encryption method using the plain data and the public key, and an output unit that outputs encrypted data that is the encrypted plain data.

15. The apparatus according to claim 10, wherein the calculating unit includes an acquiring unit that acquires a secret key and encrypted data that is the obtained data of the set represented by the projective representation and encrypted based on a public key encryption method, a decrypting unit that decrypts the encrypted data based on a public key encryption method using the encrypted data and the secret key, and an output unit that outputs plain data that is the decrypted encrypted data.

16. The apparatus according to claim 10, wherein the calculating unit includes an acquiring unit that acquires a public key that is the obtained data of the set represented by the projective representation, an encrypting unit that encrypts a common key using the public key by an encryption process based on a key encapsulation mechanism, and an output unit that outputs the encrypted common key.

17. The apparatus according to claim 10, wherein the calculating unit includes an acquiring unit that acquires a common key that is the obtained data of the set represented by the projective representation and encrypted by an encryption process based on a key encapsulation mechanism;

a decrypting unit that decrypts the common key by an decryption process based on a key encapsulation mechanism; and an output unit that outputs the decrypted common key.

18. The apparatus according to claim 14, wherein the encrypting unit encrypts the plain data based on Cramer-Shoup cryptosystem using the plain data and the public key.

19. The apparatus according to claim 15, wherein the decrypting unit decrypts the decrypted data based on Cramer-Shoup cryptosystem using the decrypted data and the secret key.

20. The apparatus according to claim 16, wherein the encrypting unit encrypts the common key by an encryption process based on the key encapsulation mechanism in the Cramer-Shoup cryptosystem.

21. The apparatus according to claim 17, wherein the decrypting unit decrypts the common key by a decryption process based on the key encapsulation mechanism in the Cramer-Shoup cryptosystem.

22. The apparatus according to claim 10, wherein the calculating unit includes an acquiring unit that acquires a secret key and a member that is a generation member for a public key and represented by the projective representation, a key generating unit that generates a public key component included in the public key, using the member and the secret key, and an output unit that outputs the public key including the generated public key component.

23. The apparatus according to claim 22, wherein the key generating unit generates the public key component based on Cramer-Shoup cryptosystem using the member and the secret key.

24. A representation converting method for public key cryptography performed by a processor programmed as a representation converting apparatus that includes an acquiring unit, a multiplying unit, an adding/subtracting unit, and an output unit, and converts data of a set of members represented by an affine representation representing a 2r-th degree algebraic torus $T_{2r}(F_q)$ (r is a prime number, and q is an integer) to data of a set of members represented by a projective representation representing a quadratic algebraic torus $T_2(F_{q^r})$, the method comprising:

acquiring data of a set of members of the 2r-th degree algebraic torus $T_2(F_q)$ represented by the affine representation, the acquired set being $(c_0, c_1, \ldots, c_{r-2})$ ($c_i$ is a member of a finite field $F_q$, where $0 \leq i \leq r-2$);

performing, by the representation converting apparatus, a multiplication operation on the acquired data of the set, the multiplication operation being determined by a condition under which the set of the quadratic algebraic torus $T_2(F_{q^r})$ is included in the 2r-th degree algebraic torus $T_{2r}(F_q)$, a modulus and a base of a quadratic extension, and a modulus and a base of an r-th degree extension;

performing an addition and subtraction operation determined by the condition, the moduli, and the bases, and therefore obtaining a set of members of the quadratic algebraic torus $T_2(F_{q^r})$ represented by the projective representation, the obtained data of the set being $(a_0, a_1, \ldots, a_{r-1}, b_0, b_1, \ldots, b_{r-1})$ ($a_j$ is a member of $F_q$ and $b_j$ is a member of $F_q$, where $0 \leq j \leq r-1$), by the adding/subtracting unit; and outputting the obtained data of the set, wherein x is a member added during a quadratic extension from an extension field $F_{q^r}$ to an extension field $F_{q^{2r}}$, and the modulus of the quadratic extension is "$f_2(x)=x^2-\delta$" and the base of the quadratic extension is $\{1, x\}$, $\delta$ being a member of the finite field $F_q$.

25. A non-transitory computer readable medium including programmed instructions that can be executed on a computer, wherein the instructions, when executed by the computer, cause the computer to perform a method of public key cryptography, comprising:

acquiring data of a set of members of the 2r-th degree algebraic torus $T_{2r}(F_q)$ represented by the affine representation, the acquired set being $(c_0, c_1, \ldots, c_{r-2})$ ($c_i$ is a member of a finite field $F_q$, where $0 \leq i \leq r-2$);

performing a multiplication operation on the acquired data of the set, the multiplication operation being determined by a condition under which the set of the quadratic algebraic torus $T_2(F_{q^r})$ is included in the 2r-th degree algebraic torus $T_{2r}(F_q)$, a modulus and a base of a quadratic extension, and a modulus and a base of an r-th degree extension;

performing an addition and subtraction operation determined by the condition, the moduli, and the bases, and therefore obtaining data of a set of members of the quadratic algebraic torus $T_2(F_{q^r})$ represented by the projective representation, the obtained data of the set being $(a_0, a_1, \ldots, a_{r-1}, b_0, b_1, \ldots, b_{r-1})$ ($a_j$ is a member of $F_q$ and $b_j$ is a member of $F_q$, where $0 \leq j \leq r-1$) of the quadratic algebraic torus $T_2(F_{q^r})$ represented by the projective representation; and outputting the obtained data of the set, wherein x is a member added during a quadratic extension from an extension field $F_{q^r}$ to an extension field $F_{q^{2r}}$, and the modulus of the quadratic extension is "$f_2(x)=x^2-\delta$" and the base of the quadratic extension is $\{1, x\}$, $\delta$ being a member of the finite field $F_q$.

* * * * *